United States Patent
Kim et al.

(10) Patent No.: US 7,706,259 B2
(45) Date of Patent: Apr. 27, 2010

(54) METHOD FOR IMPLEMENTING REDUNDANT STRUCTURE OF ATCA (ADVANCED TELECOM COMPUTING ARCHITECTURE) SYSTEM VIA BASE INTERFACE AND THE ATCA SYSTEM FOR USE IN THE SAME

(75) Inventors: Yong Tae Kim, Daejeon (KR); Sang Yeoun Lee, Daejeon (KR); Kwang Suk Song, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 677 days.

(21) Appl. No.: 11/635,173

(22) Filed: Dec. 7, 2006

(65) Prior Publication Data
US 2007/0127365 A1    Jun. 7, 2007

(30) Foreign Application Priority Data
Dec. 7, 2005   (KR)   .................. 10-2005-0119122
Jul. 4, 2006   (KR)   .................. 10-2006-0062677

(51) Int. Cl.
*H04L 12/28*   (2006.01)

(52) U.S. Cl. ................ 370/228; 370/469; 370/522; 714/2; 714/48

(58) Field of Classification Search ........... 370/228, 370/217, 218, 221, 410, 469, 522; 714/2, 714/3, 4, 48
See application file for complete search history.

(56) References Cited

U.S. PATENT DOCUMENTS

| | | | | |
|---|---|---|---|---|
| 6,108,300 | A * | 8/2000 | Coile et al. | 370/217 |
| 6,173,411 | B1 * | 1/2001 | Hirst et al. | 714/4 |
| 6,392,990 | B1 * | 5/2002 | Tosey et al. | 370/218 |
| 2007/0038732 | A1 * | 2/2007 | Chandwani et al. | 709/223 |
| 2007/0070975 | A1 * | 3/2007 | Otani et al. | 370/351 |

FOREIGN PATENT DOCUMENTS

| | | |
|---|---|---|
| KR | 10-0173205 | 10/1998 |
| KR | 2004-0054947 A | 6/2004 |
| KR | 2005-0019954 A | 3/2005 |
| KR | 2006-0058798 A | 6/2006 |
| KR | 2006-0070310 A | 6/2006 |
| KR | 10-0694297 B1 | 3/2007 |

* cited by examiner

*Primary Examiner*—Ricky Ngo
*Assistant Examiner*—Luat Phung
(74) *Attorney, Agent, or Firm*—Ladas & Parry LLP (57) ABSTRACT

A method for implementing a redundant structure of an ATCA system via a base interface of a network system based on an ATCA standard, and the ATCA system for use in the same are disclosed. Each of routing protocol shelves and LI shelves includes two ports connected to two IPC paths provided from the base interface, such that a representative IP address is assigned to a single port to be used, performs IPC communication using the representative IP address. If a port error or link-down state occurs, the representative IP address is assigned to the other port, resulting in the implementation of stable IPC communication. If the port error or link-down state occurs in an active-mode ShMC shelf, an IPC path passing through a standby-mode ShMC shelf is provided.

8 Claims, 10 Drawing Sheets

(PRIOR ART)

FIG. 1

(PRIOR ART)

FIG. 2

(PRIOR ART)

FIG. 3

(PRIOR ART)

METHOD FOR IMPLEMENTING REDUNDANT STRUCTURE OF ATCA (ADVANCED TELECOM COMPUTING ARCHITECTURE) SYSTEM VIA BASE INTERFACE AND THE ATCA SYSTEM FOR USE IN THE SAME

RELATED APPLICATION

The present application is based on, and claims priority from, Korean Application Number 2005-119122, filed Dec. 7, 2005, and Korean Application Number 2006-62677, filed Jul. 4, 2006, the disclosure of which is incorporated by reference herein in its entirety.

BACKGROUND OF THE INVENTION

1. Field of the Invention

The present invention relates to a method for implementing a redundant structure (also called a dual or duplex configuration) of an ATCA (Advanced Telecom Computing Architecture) system via a base interface of a network system based on an ATCA standard, and the ATCA system for use in the same.

2. Description of the Related Art

Since the ATCA standard has been recently being introduced to network devices, many of the compatibility limitations between the network devices have been obviated, and the cost of ATCA device-associated technologies have been reduced.

The above-mentioned network system based on the ATCA standard (hereinafter referred to as an ATCA system) employs duplex or dual configurations of individual internal constituent elements. These ATCA individual internal constituent elements can include, for example, a routing protocol shelf, a switch fabric shelf, a shelf management control (ShMC) shelf, and IPC shelves.

The ATCA standard provides only duplex- or duplex-hardware configurations of individual shelves. However, the ATCA standard does not provide unique functions to be executed by the individual shelves so as to implement the duplex hardware configurations.

A network system incapable of satisfying the ATCA standard may even require hardware and software engineering to achieve duplex configuration.

However, an ATCA system that does implement the duplex configuration within a predetermined range means the hardware standard is not compromised.

In more detail, the conventional ATCA system independently configures a duplex channel or hardware device between the individual shelves, and can implement the duplex configuration by allowing duplex shelves to communicate with each other via the above-mentioned channel or hardware device. However, configuring the above-mentioned conventional ATCA system is difficult to add additional channels or hardware devices for implementing the duplex configuration within the ATCA standard. As a result, the ATCA system cannot be configured in a duplex configuration using the above-mentioned conventional method without significant changes.

Figure 1:
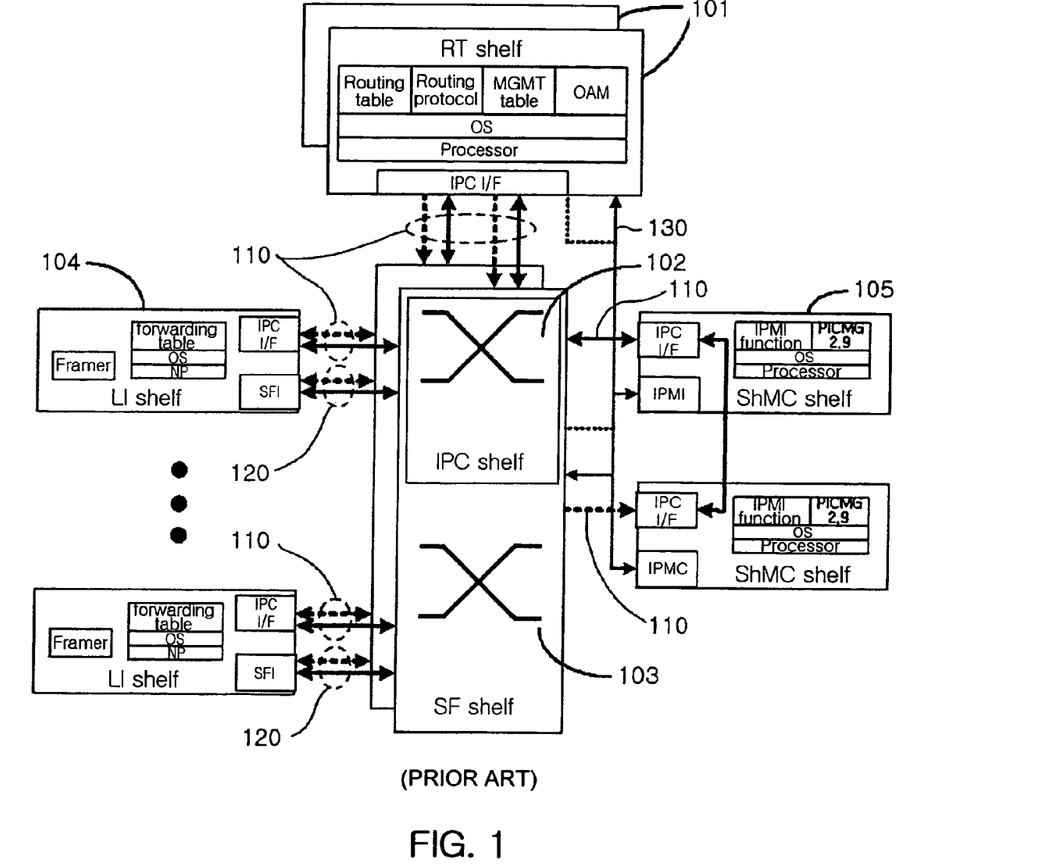
FIG. 1 is a block diagram illustrating a conventional ATCA system.

FIG. 1 is a block diagram illustrating a conventional ATCA system. Referring to FIG. 1, the ATCA system includes a Routing Protocol (RP) shelf 101, an Inter-Processor Communication (IPC) shelf 102, a Switch Fabric (SF) shelf 103, a Line Interface (LI) shelf 104, a Shelf Management Control (ShMC) unit. Two RP shelves 101, two IPC shelves 102, two SF shelves 103, and two ShMC shelves 105 are required to implement the duplex configuration.

The RP shelf 101 acts as a processor shelf for controlling overall operations of the ATCA system and the routing process. The RP shelf 101 transmits or receives control packets to other shelves 103, 104, and 105 contained in the ATCA system via the IPC shelf 102 connected to the base interface 110 defined in the ATCA standard.

The IPC shelf 102 acts as a switch for exchanging control packets with individual shelves, and is connected as a dual-star configuration to the individual shelves 101, 104, and 105 via the base interface 110.

The SF shelf 103 acts as a switching shelf for exchanging packet data with a plurality of LI shelves 104, and is connected as a dual-star or full-mesh configuration to the LI shelves 104 via a fabric interface 120.

The LI shelf 104 acts as an I/O (Input/Output) interface between the ATCA system and an external device, and at least one LI shelf 104 exists. Each LI shelf 104 is connected to the SF shelf 103 via the fabric interface 120, and is connected to the IPC shelf via the base interface 110.

The ShMC shelf 105 manages status-, sensor-, and event-information of the individual shelves 101, 102, 103, and 104 contained in the ATCA system, and controls the power of each shelf 101, 102, 103, or 104, such that it can manage the ATCA system. In more detail, the ShMC shelf 105 is connected to the RP shelf 101 via the base interface 110, performs IPC communication, and at the same time manages each shelf via an IPMB (Intelligent Platform Management Bus) interface 130.

The base interface 110 is implemented with a duplex path between the RP shelf 101 and the IPC shelf 102 or between the IPC shelf 102 and the LI shelf 104. The base interface 110 is implemented with a single path between the IPC shelf 102 and the SF shelf 103 or between the IPC shelf 102 and the ShMC shelf 105.

The above-mentioned interface applied to the ATCA system will hereinafter be described with reference to FIG. 2.

Figure 2:
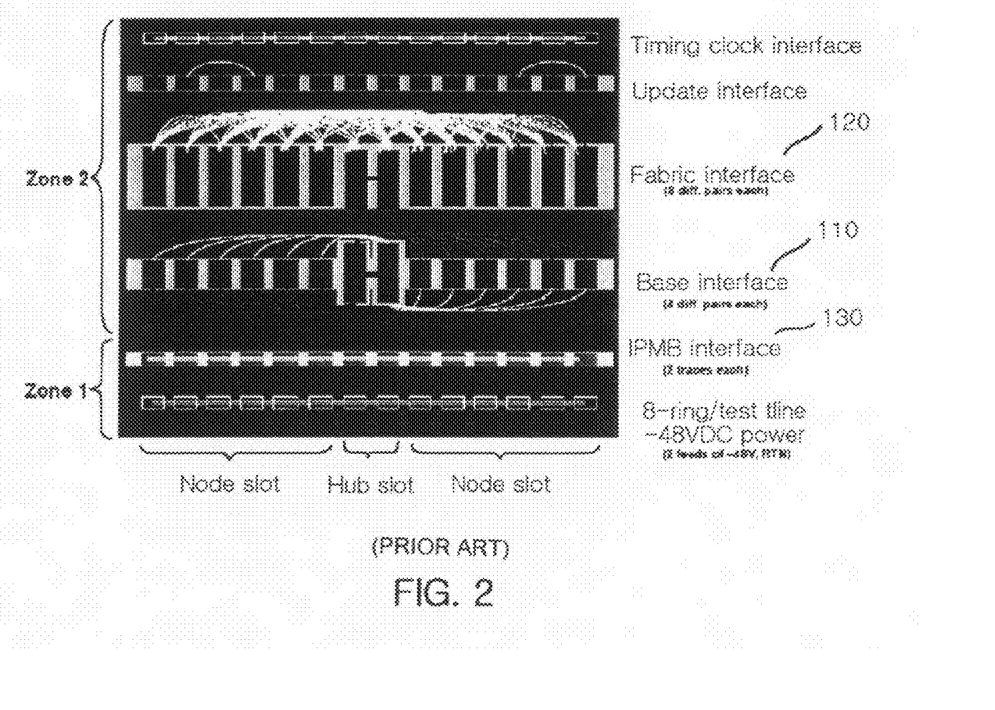
FIG. 2 is a configuration diagram illustrating backplanes of the ATCA systems based on the ATCA standard.

FIG. 2 is a configuration diagram illustrating an ATCA system's backplane based on the ATCA standard.

Referring to FIG. 2, the base interface 110 and the fabric interface 120 are defined in a "Zone2" area for transmitting ATCA-based high-speed data. The IPMB interface for managing the ATCA system of the ShMC shelf 105 is defined in a "Zone1" area based on the ATCA standard.

The IPC shelf 102 and the SF shelf 103 are located at the same places, such that they can be easily connected to the base interface 110 and the fabric interface 120. Generally, the IPC shelf 102 and the SF shelf 103 are integrated in a single shelf, or the IPC shelf 102 configured in the form of a dot-shelf is located at the SF shelf 103.

Figure 3:
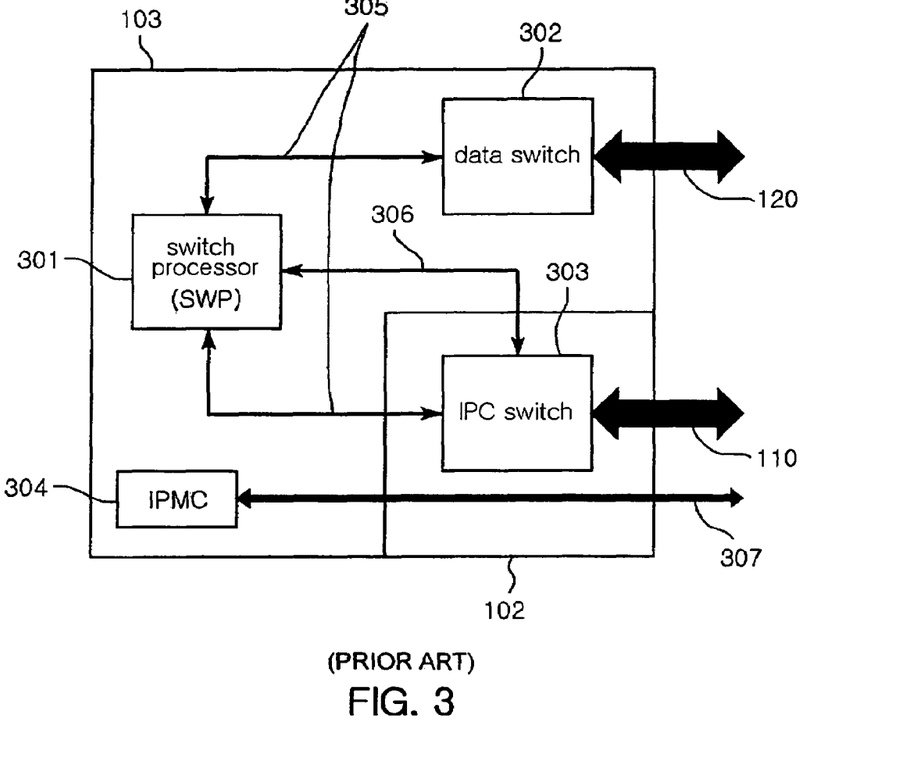
FIG. 3 is a block diagram illustrating a switch fabric shelf for use in the ATCA system.

FIG. 3 is a block diagram illustrating the IPC shelf 102 and the SF shelf 103.

Referring to FIG. 3, the SF shelf 103 includes: a switch processor (SWP) 301 for controlling the IPC switching operation and the data switching operation; a data switch 302 for switching I/O packets of the LI shelves 104 via the fabric interface 120; and an IPMC (Intelligent Platform Management Controller) 304 for communicating with the ShMC shelf 105 via the IPMB interface 130, and performing shelf management.

The IPC shelf 102 includes the IPC switch 303 for switching data exchanged with individual shelves via the base interface 110. The IPC switch 303 is controlled by a switch processor 301 contained in the SF shelf 103.

The switch processor controls the data switch 302 and the IPC switch 303 via the data bus 305.

In addition, the IPC switch 303 configures the Ethernet interface with the SF shelf 103 via the line 307.

As described above, the ATCA standard has hardware for the duplex configuration, however, it does not describe a method for controlling a duplex configuration between two RP shelves 101, a duplex configuration between two IPC shelves 102, a duplex configuration between two SF shelves 103, and a duplex configuration between two LI shelves 104. As a result, it is difficult to implement a stable duplex configuration using only the above-mentioned configurations and components.

Figure 4:
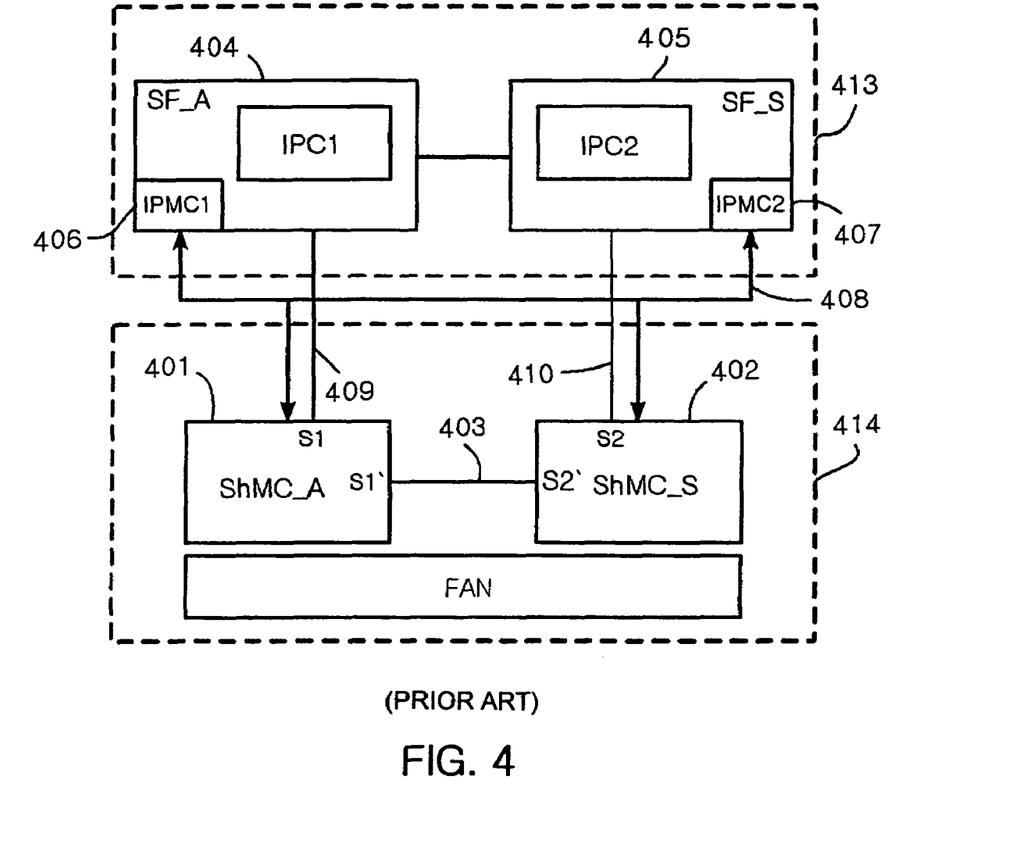
FIG. 4 is a block diagram illustrating a conventional duplex configuration of the ShMC shelf contained in the ATCA system.

FIG. 4 is a block diagram illustrating a duplex configuration of the ShMC shelf used for the conventional ATCA system.

Referring to FIG. 4, the reference numbers 401 and 402 indicate two duplex ShMC shelves. The reference numbers 404 and 405 indicate two duplex SF shelves. In this case, the SF shelves 404 and 405 include the IPC shelves, each of which is configured in the form of a dot shelf, or the SF shelves 404 and 405 may be located at the same shelf.

In order to acquire stable duplex operations from the above-mentioned duplex configuration, duplex information is continuously communicated between an active ShMC shelf 401 and an inactive ShMC shelf (also called a standby ShMC shelf) 402, and is continuously communicated between an active SF shelf 404 and an inactive SF shelf (also called a standby SF shelf) 405. In this case, if an unexpected problem occurs in the active shelf, the inactive shelf (i.e., the standby shelf) must quickly enter into the active mode.

For this purposes, the ShMC shelf 401 transmits/receives duplex-associated information to/from the other ShMC shelf 402 over a single Ethernet channel 403 received via the base interface 110. If an unexpected problem does occur during the communication time of the two ShMC shelves 401 and 402, then shelf switching is performed.

The ShMC shelf 401 is connected to the SF shelf 404 over a single Ethernet channel 409 received via the base interface, and the other ShMC shelf 402 is connected to the other SF shelf 405 over a single Ethernet channel 410 received via the base interface. The ShMC shelf 401 is connected to the first IPMC 406 contained in the SF shelf 404 via the IPMB interface 408, and the other ShMC shelf 402 is connected to the second IPMC 407 contained in the other SF shelf 405 via the IPMB interface 408, such that the ATCA system can be managed by the ShMC shelves 401 and 402.

For reference, interfaces of the SF shelves 404 and 405 are interconnected via a backplane 413, and interfaces of the ShMC shelves 401 and 402 are interconnected via the other backplane 414. The backplanes 413 and 414 are separated from each other.

However, each of the Ethernet channels 409 and 410 contained in the above-mentioned duplex configuration is configured in the form of a single configuration. Therefore, if unexpected problems occur in the Ethernet port, the conventional ATCA system has difficulty in performing normal duplexing operations.

SUMMARY OF THE INVENTION

Therefore, the present invention has been made in view of the above problems, and it is an object of the present invention to provide a method for implementing a duplex configuration of the ATCA system using a base interface capable of implementing the duplex configuration within the range of an ATCA standard pre-defined for IPC communication, and the ATCA system for use in the same.

In accordance with one aspect of the present invention, the above and other objects can be accomplished by the provision of a duplex implementation method of an Advanced Telecom Computing Architecture (ATCA) system via a base interface capable of providing a duplex IPC communication path between two duplex IPC shelves and two duplex routing protocol shelves, each of the routing protocol shelves comprising the steps of: a) assigning an IP address to any one of two ports connected to the base interface; b) performing transmission/reception of state- and synchronous-data with a counterpart routing protocol shelf using a representative IP address, and performing transmission/reception state information with individual switching processors of the IPC shelves; c) determining whether unexpected error or link-error occurs in a port to which the representative IP address has been assigned; and d) if the port errors or the link errors are detected, assigning the representative IP address to the other port, and performing port-switching operation.

In accordance with another aspect of the present invention, there is provided an Advanced Telecom Computing Architecture (ATCA) system for providing a duplex IPC path between routing protocol shelves and IPC shelves via a base interface, providing a duplex IPC path between the IPC shelves and Line Interface (LI) shelves, and providing a single IPC path between the IPC shelves and Switch Fabric (SF) shelves or between the IPC shelves and ShMC (Shelf management Control) shelves, the system comprising: two duplex routing protocol shelves for assigning a representative IP address to a first port to be used, exchanging state information and synchronous data with each other via the representative IP address, and assigning the representative IP address to a second port if an error or link-down state occurs in the first port or there is no response signal within a predetermined period, thereby performing a port switching operation; two IPC shelves for switching control packets between the routing protocol shelves, the LI shelves, and the ShMC shelves, and providing IPC communication; a plurality of LI shelves, each of which includes two ports connected to two IPC paths connected to the two IPC shelves, for assigning a representative IP address to a first port to be used, performing IPC communication with the routing protocol shelves using the representative IP address, assigning the representative IP address to a second port if an error or link-down state occurs in the first port to which the representative IP address is assigned, continuously performing IPC communication, and performing I/O (Input/Output) interfacing with any external device; switch fabric (SF) shelves for exchanging packets with the LI shelves; and two ShMC shelves, under an active mode, for performing IPC communication with the routing protocol shelves with the single IPC path received via the base interface, managing state-, sensor-, and event-information of the routing protocol shelves, the LI shelves, the IPC shelves, and the SF shelves, controlling individual powers of the routing protocol shelves, the LI shelves, the IPC shelves, and the SF shelves; and, under a standby mode, for providing a data bridge function for the IPC commination of an active-mode ShMC shelf in which a port error or link-down state has occurred.

Therefore, the ATCA system can stably maintain the IPC path among the duplex shelves even though a port error or link-down state occurs within the range of an ATCA standard, resulting in the implementation of reliable and stable operations.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A duplex implementation method for controlling each shelf to effectively perform the duplexing operation within the ATCA standard range in the ATCA system shown in FIG. 1, and an apparatus for the same will hereinafter be described with reference to the annexed drawings.

Figure 5:
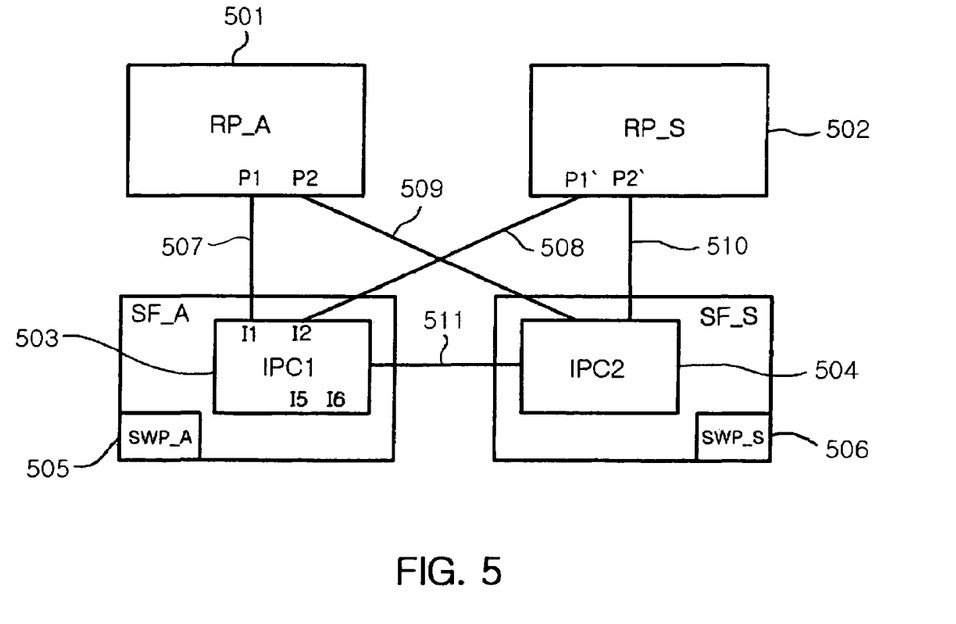
FIG. 5 is a configuration diagram illustrating an RP (Routing Protocol) shelf for use in an ATCA system according to the present invention.

FIG. 5 is a configuration diagram illustrating an RP (Routing Protocol) shelf for use in an ATCA system according to the present invention.

Referring to FIG. 5, the ATCA system according to the present invention shows the duplex configuration of the RP shelf. Particularly, the reference numbers 501 and 502 are indicative of two duplex RP shelves, respectively. The reference numbers 503 and 504 are indicative of two duplex IPC shelves for exchanging control packets with others, respectively. The reference numbers 505 and 506 are indicative of two switching processors, each of which is contained in the SF shelf, such that the IPC shelves 502 and 503 are controlled by the switching processors.

As can be seen from FIG. 5, one of the two duplex devices is in an active mode, such that the active-mode duplex device is represented by "_A". The other one of the two duplex devices is in a standby mode, such that the standby-mode duplex device is represented by "_S".

In addition, the first RP shelf 501 includes two Ethernet ports P1 and P2, and the second RP shelf 502 includes two Ethernet ports P1' and P2'. The first RP shelf 501 is connected to the IPC shelves 503 and 504 via the respective two Ethernet ports P1 and P2 of the first RP shelf 501. The second RP shelf 502 is connected to the IPC shelves 503 and 504 via the respective two Ethernet ports P1' and P2' of the second RP shelf 502. The two IPC shelves 503 and 504 are interconnected to each other via a single Ethernet channel 511.

In other words, the first and second RP shelves 501 and 502 are connected to the first and second IPC shelves 503 and 504 over duplex paths 507-510 of the base interface. The IPC shelves 503 and 504 are interconnected together via a single path 511.

Therefore, the first and second RP shelves 501 and 502 of the above-mentioned duplex configuration can stably exchange mutual duplex information with each other via the path 507↔509, 509↔510, or 507↔511↔510 even though the first and second RP shelves 501 and 502 are switched or the IPC shelves 503 and 504 are switched. The duplex implementation method of the first and second RP shelves 501 and 502 according to the above-mentioned configuration will hereinafter be described.

Figure 6:
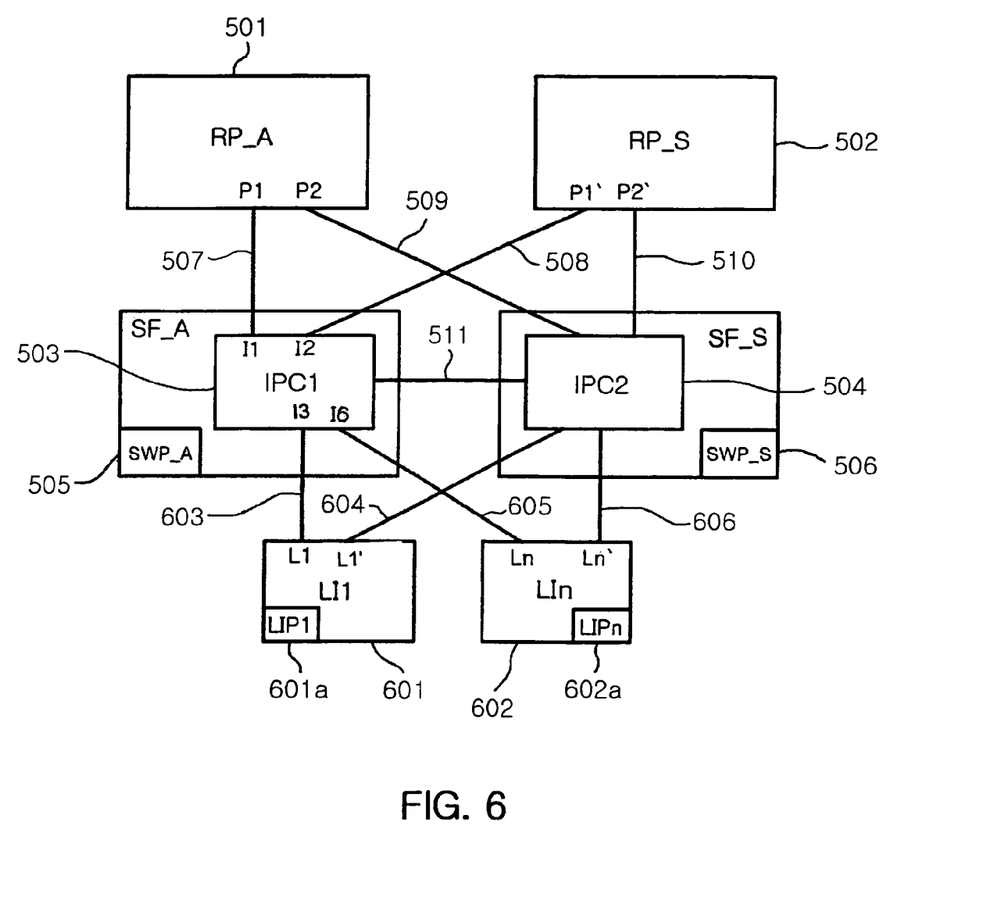
FIG. 6 is a configuration diagram illustrating a Line Interface (LI) shelf for use in an ATCA system according to the present invention.

FIG. 6 is a configuration diagram illustrating a Line Interface (LI) shelf for use in an ATCA system according to the present invention.

Referring to FIG. 6, the ATCA system according to the present invention shows the duplex configuration of the LI shelf. Particularly, the reference numbers 601 and 602 are indicative of a plurality of LI shelves. The reference numbers 601a and 602a are indicative of processors contained in the respective individual LI shelves 601 and 602. The first LI shelf 601 includes two duplex Ethernet ports L1 and L1'. The second LI shelf 602 includes two duplex Ethernet ports Ln and Ln'. The duplex Ethernet ports L1 and L1' of the LI1 shelf 601 are respectively connected to the IPC shelves 503 and 504 via duplex paths 603~604 of the base interface. The duplex Ethernet ports Ln and Ln' of the LIn shelf 602 are respectively connected to the IPC shelves 503 and 504 via duplex paths 605~606.

By the above-mentioned configuration, the LI shelves 601 and 602 check states of two ports. If a link-down state of any one of the two ports is detected, the link-down port is switched to the other port of the normal state. Therefore, control packets are exchangeable via the duplex paths 603~604 and 605~606.

The duplex implementation method of the LI shelves 601 and 602 will hereinafter be described in detail.

Figure 7:
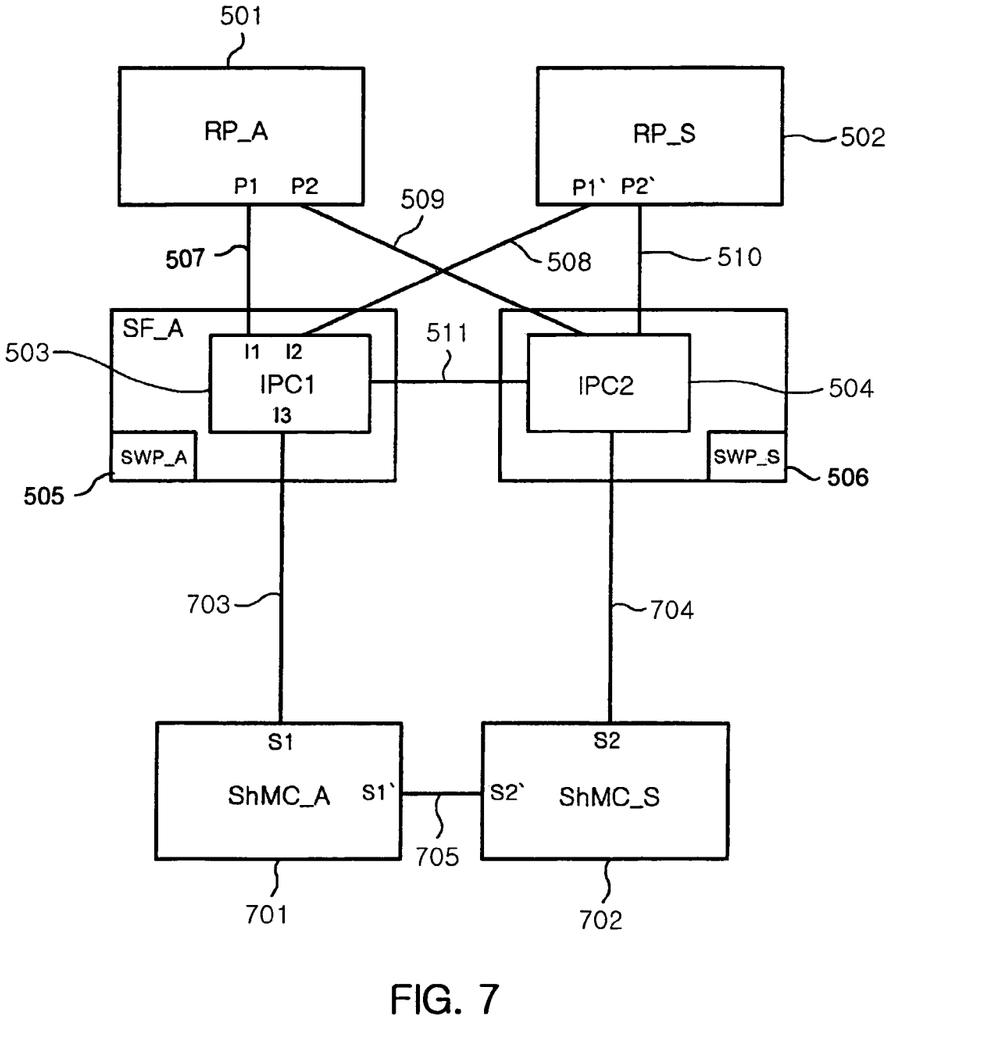
FIG. 7 is a configuration diagram illustrating an ShMC shelf for use in an ATCA system according to the present invention.

FIG. 7 is a configuration diagram illustrating an ShMC shelf for use in an ATCA system according to the present invention.

Referring to FIG. 7, the reference numbers 701 and 702 are indicative of two duplex ShMC shelves, respectively.

The first ShMC shelf 701 is connected to the IPC shelf 503 via a single Ethernet path 703. The second ShMC shelf 702 is connected to the IPC shelf 504 via the other Ethernet path 704. The above-mentioned Ethernet paths 703, 704, and 705 are supported by the base interface.

The standby-mode ShMC shelf (e.g., the ShMC shelf 702) from among the above-mentioned ShMC shelves 701 and 702 includes a data bridge function capable of enabling the active-mode ShMC shelf 701 to communicate with the RP shelves 501 and 502 via the Ethernet paths 705 and 704 on the condition that the active-mode ShMC shelf 701 is determined to be unable to communicate with the RP shelves 501 and 502 due to an interruption occurrence of a port's link-down state.

In addition, if necessary information is not received from the active-mode ShMC shelf 701 via the Ethernet path 705, then it is determined that the ShMC shelf 701 is in the link-down state, such that the link-down ShMC shelf 701 is switched to the active-mode ShMC shelf 702, resulting in the implementation of stable duplex effects. The above-mentioned duplex implementation method will hereinafter be described in detail.

Figure 8:
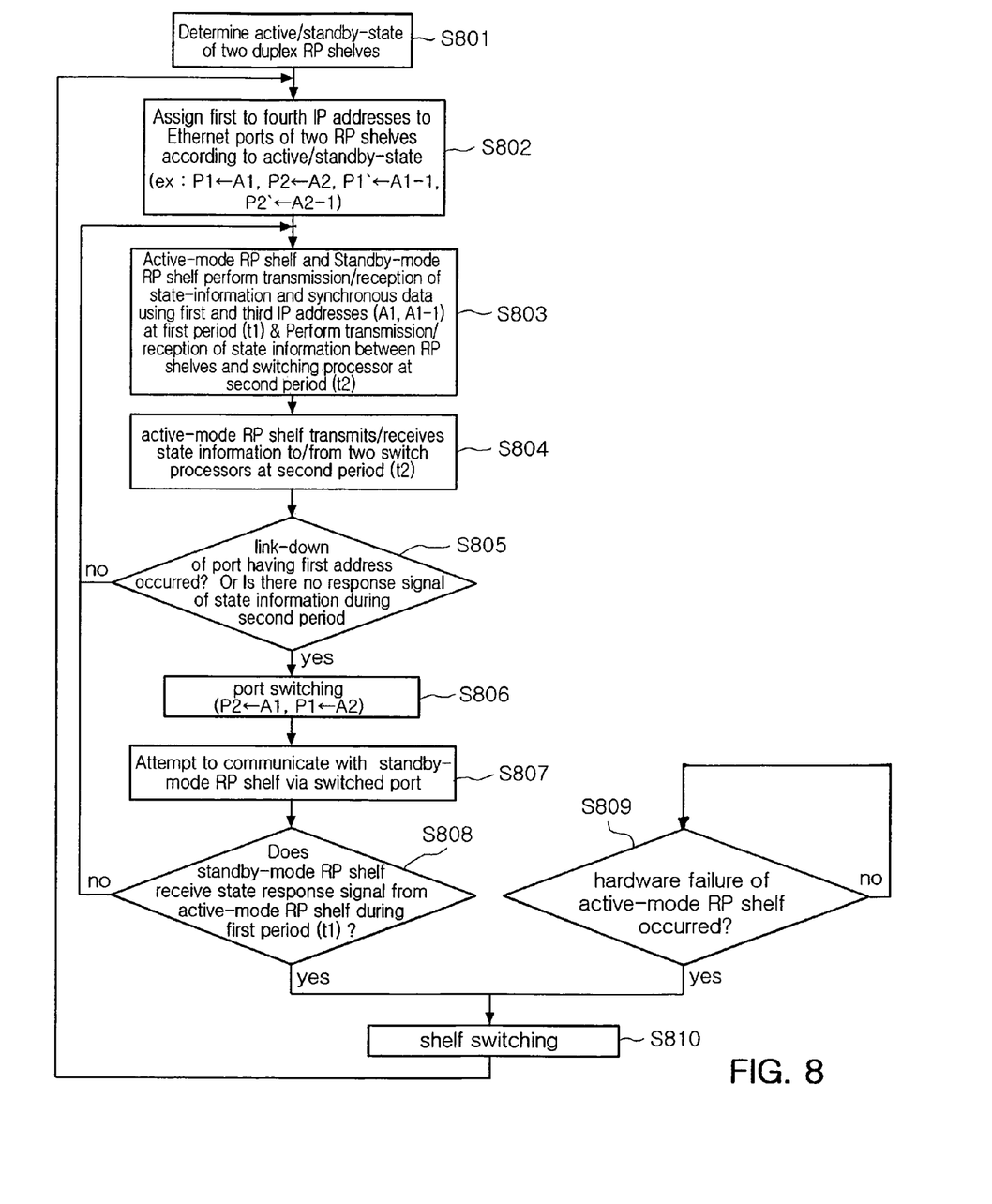
FIG. 8 is a flow chart illustrating an RP shelf's duplexing procedure contained in a method for implementing the duplex configuration of the ATCA system according to the present invention.

FIG. 8 is a flow chart illustrating an RP shelf's duplexing procedure contained in a method for implementing the duplex configuration of the ATCA system according to the present invention.

Referring to FIG. 8, the ATCA system determines the active or standby mode of the two RP shelves 501 and 502 having the duplex configuration. An IPC path for the active-mode RP shelf 501 is determined according to the determined result. If one of the two RP shelves 501 and 502 is in the active mode, then the other one is determined to be the standby-mode RP shelf at step S801.

Determination of the active/standby modes of the above-mentioned RP shelves 501 and 502, and the determination of the IPC paths 507-510 are achieved by the two RP shelves 501 and 502 which communicate with each other via the P1~P1' ports or the P2 port, or the P2' port connected to the base interface during the booting of the ATCA system.

In the case of the above-mentioned preferred embodiment of FIG. 5, the RP shelf 501 is determined to be an active-mode RP shelf, and the other RP shelf 502 is determined to be a standby-mode RP shelf.

As described above, the RP shelves 501 and 502 will be designated as either being in the active mode or the standby mode, and in the event that the RP shelf 501 acquires the active mode then the RP shelf 501 assigns a prescribed first IP address (e.g., A1) to the port P1 connected to the determined IPC path, assigns a second IP address (e.g., A2) to the other port P2. Also, in the event that the RP shelf 502 acquires the standby mode then the RP shelf 502 assigns a third IP address (e.g., A1-1) indicating a relative IP address of the above-mentioned first IP address to the port P1' connected to the determined IPC path. In this scenario, the RP shelf 502 also assigns a fourth IP address (e.g., A2-1) to the port P2' at step S802.

As described in the above scenario, if the IP addresses are assigned to the two duplex ports, the active-mode RP shelf 501 and the standby-mode RP shelf 502 exchange their state information and synchronous data (e.g., a routing table) with each other at a first period (t1) using the first and third IP addresses A1 and A1-1 as source and destinations at step S803.

In the case of the example of FIG. 5, since the first address is assigned to the P1 port and the third address is assigned to the P1' port, then the state information and the synchronous data are communicated via the Ethernet paths 507 and 508 at the first period (t1).

The active-mode RP shelf 501 transmits or receives its own state information to/from two switch processors 505 and 506 for controlling the SF shelf and the IPC shelf at a second period (t2) (where, t1>t2+duplex processing time) at step S804.

The active-mode RP shelf 501 continuously checks whether the link-down state occurs in the P1 port having the first address due to errors of the Ethernet port P1 or I1 communicating with the IPC shelf. Also, the active-mode RP shelf 501 determines whether a response signal is received from the standby-mode RP shelf 502 within the second period (t2) acting as a periodic response time of state information at step S805.

In this case, if the link-down state occurs in the P1 port having the first address or the response signal is not received from the standby-mode RP shelf 502 within the second period (t2), the active-mode RP shelf 501 performs the switching of ports, such that the IP address of the Ethernet port P1 is switched to the IP address of the Ethernet port P2 by the active-mode RP shelf 501 at step S806. Namely, the first IP address A1 is assigned to the P2 port, and the second IP address A2 is assigned to the P1 port. The above-mentioned operations is equally applied to the ports P1' and P2' of the RP shelves 502. The aforementioned port switching is immediately performed when the link-down mode occurs, or is performed during the second period (t2) during which there is no response signal.

If the above-mentioned port switching is performed, the active-mode RP shelf 501 attempts to communicate with the standby-mode RP shelf 502 using the P2 port (i.e., the switched port) to which the first address A1 is assigned at step S807. The above-mentioned communication attempt is achieved by the paths 509↔511↔508 when the P1' port of the standby-mode RP shelf 502's P1' port has the third address A1-1.

In the meantime, the standby-mode RP shelf 502 determines the presence or absence of the state response signal from the active-mode RP shelf 501 during the time (t1) after the standby-mode RP shelf 502 begins to attempt communication at step S808. If there is no state response signal during the time (t1), the standby-mode RP shelf 502 determines that the active-mode RP shelf 502's port switching has failed, such that it acquires the active mode, and performs the shelf switching for converting the RP shelf 501 into the standby-mode RP shelf 501 at step S810.

In addition, the active-mode RP shelf 501 determines the presence or absence of the port errors after performing the port switching. The standby-shelf RP shelf 502 detects the presence or absence of the error in each shelf using the two switching processors 505 and 506, and informs the operator of specific information indicating whether the shelf switching is performed or not.

In the meantime, the standby-mode RP shelf 502 determines whether unexpected hardware errors occur in the active-mode RP shelf 501 at step S809

If the hardware error occurs in the active-mode RP shelf 501 at step 809, then this state is recorded in the IPMC (not shown), and the shelf switching is immediately performed at step S810.

If the shelf switching is performed at step 810, the now active-mode RP shelf 502 returns to step S802, such that the first IP address (A1) is assigned to the P1's port, and the second port A2 is assigned to the P2's port. Simultaneously, the now standby-mode RP shelf 501 assigns the third IP address A1-1 to the fourth address A2-2 to the P1 port, and assigns the fourth IP address A2-2 to the P2 port. In this way, the above-mentioned processes for checking the state information while transmitting/receiving data with the P1' and P1 ports to which the first and third IP address are assigned, respectively, are repeatedly performed.

Figure 9:
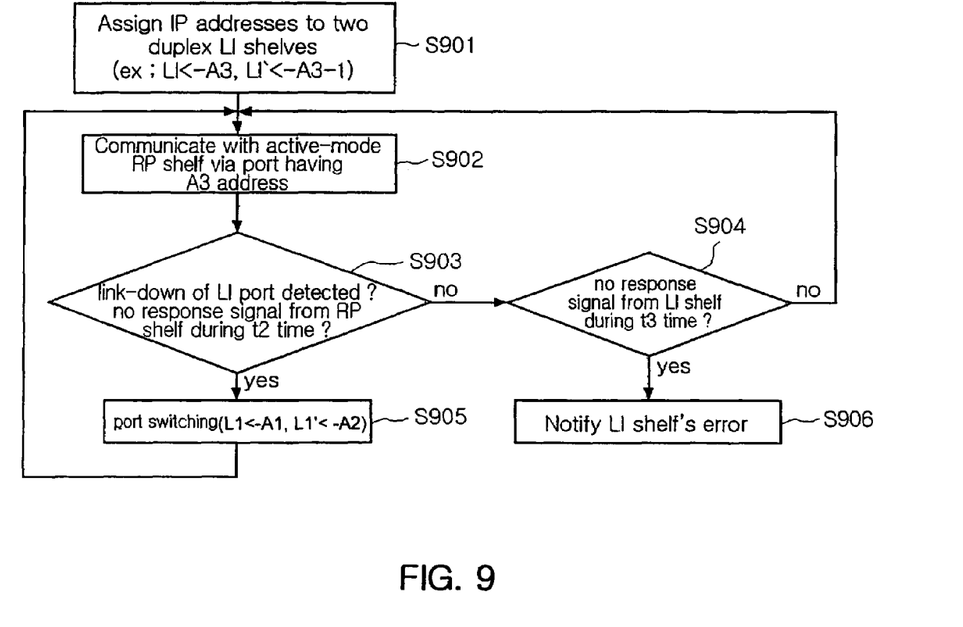
FIG. 9 is a flow chart illustrating an LI shelf's duplexing procedure contained in a method for implementing the duplex configuration of the ATCA system according to the present invention.

FIG. 9 is a flow chart illustrating an LI shelf's duplexing procedure contained in a method for implementing the duplex configuration of the ATCA system according to the present invention. The operations of FIG. 9 will hereinafter be described with reference to FIG. 6.

Referring to FIG. 9, the LI shelves 601 and 602 implement only the port duplexing Ln and Ln' of the interfacing shelf as described above. Operations of the above-mentioned LI shelves 601 and 602 are equal to each other, such that only the LI shelf 601 will be described as an example.

In the above-mentioned configuration, the processor 601a of the LI shelf 601 assigns the fifth IP address A3 acting as a prescribed IP address according to a slot number of the port L1, and assigns a sixth IP address (e.g., A3-1) to the remaining port L1' at step S901.

As described above, if each IP address is assigned to each of the two duplex ports, the LI shelf 601 performs transmission/reception of control packets via the LI port to which the fifth IP address A3 is assigned, such that the LI shelf 601 communicates with the active-mode RP shelf 501 at step S902. In this scenario, the RP shelf 501 and the IPC shelf 502 are in the active mode, the IPC communication is performed between the LI shelf 601 and the RP shelf 501.

By the above-mentioned communication, the LI shelf's processor 601a determines whether an error at the port-link down occurs by the I3 port of the IPC shelf 503 or an error occurs at the L1 of the LI shelf 601, and determines whether there is a response signal of the RP shelf within the second period (t2) at step S903.

As a result, if the port link-down occurs, or if the RP shelf has no response signal during the second period (t2), then the IP address of one of the two ports is changed to that of the other one of the two ports, such that the port switching is performed at step 904. This port switching includes a fifth IP address (A3) being assigned to the L1' port, and a sixth IP address (A3-1) being assigned to the L1' port. Due to the above-mentioned port switching, the IPC communication being performed via the L1' port to which the fifth IP address A3 is assigned. For example, if the RP shelf 501 or the IPC shelf 503 is in the active mode, data communication is achieved via the path 604↔511↔507 passing through the standby-mode IPC shelf 504.

As a result, port switching of the above-mentioned LI shelf 601 is achieved as soon as the port's link interrupt is detected.

Also, the LI shelf 601's processor 601a communicates with the RP shelf via the above-mentioned port switching process.

In this case, the active-mode RP shelf 501 determines whether a response signal is generated from the LI shelf 601 during the third period (t3) (where t3>r2+duplex processing time) at step S905. If the response signal has been generated from the LI shelf 501 at step S905, then it is determined that the active-mode RP shelf 501 is operating normally, and continuously communicates with the LI shelf 601 via a specific port to which the fifth IP address was assigned.

Otherwise, if there is no response signal received from the LI shelf 601 within the third period at step S905, then it is determined unexpected errors have occurred in the LI shelf 601, such that the detected error of the LI shelf 601 is notified to an operator or manager at step S906.

The above-mentioned operations are applied to the all LI shelves contained in the ATCA system According to the above-mentioned method, the LI shelf 601 performs IPC communication via other paths even though the port link-down state has occurred, and can perform stable operations.

Figure 10:
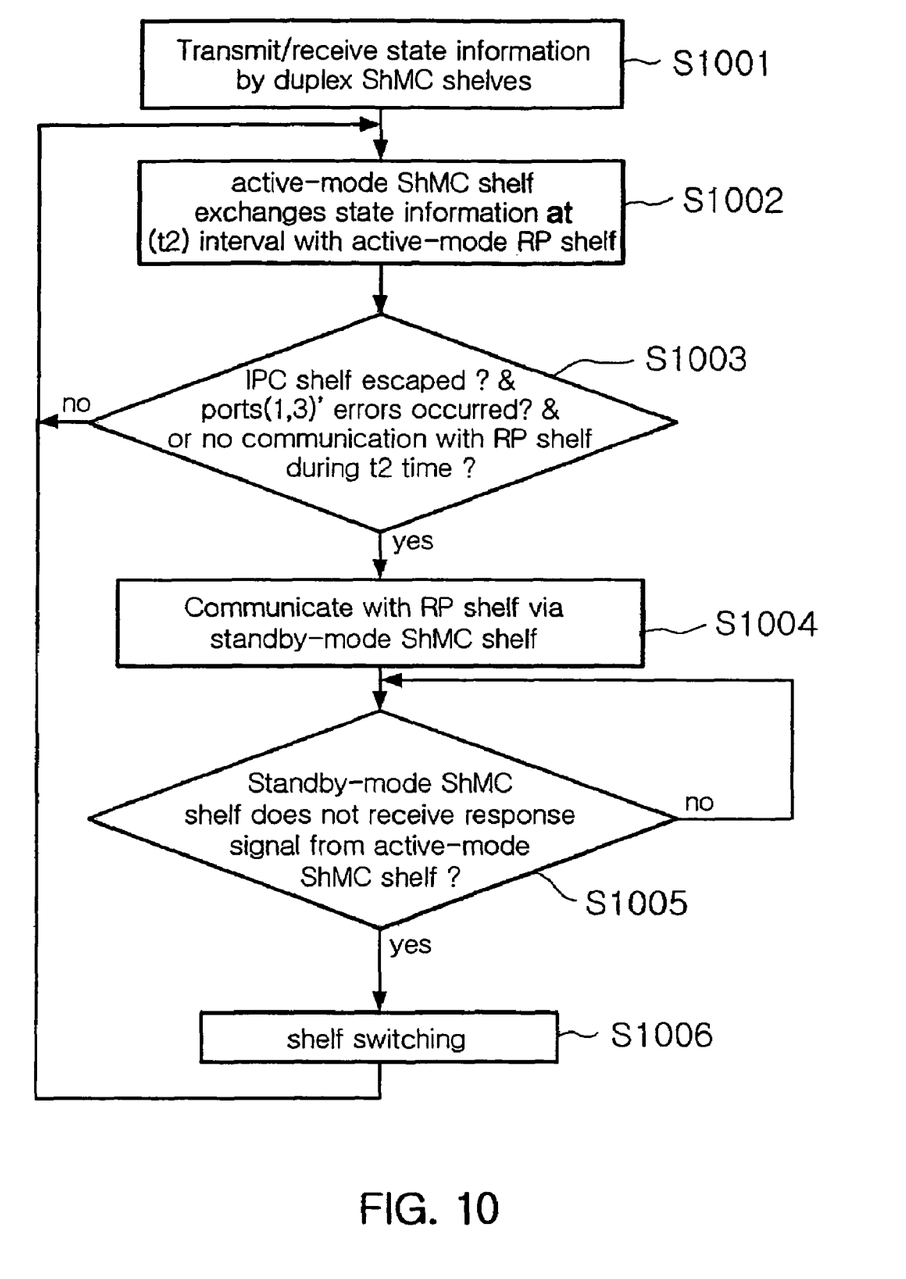
FIG. 10 is a flow chart illustrating an ShMC shelf's duplexing procedure contained in a method for implementing the duplex configuration of the ATCA system according to the present invention.

FIG. 10 is a flow chart illustrating an ShMC shelf's duplexing procedure contained in a method for implementing the duplex configuration of the ATCA system according to the present invention.

The ShMC's duplex implementation method will hereinafter be described with reference to FIG. 7.

Referring to FIG. 7, state information of the ShMC shelf 702 exchanges with that of the other ShMC shelf 702 via the path 703 during the initialization, such that one of the two ShMC shelves 701 and 702 is determined to be the active-mode ShMC shelf, and the other one is determined to be the standby-mode ShMC shelf at step S1001.

In the case of the above-mentioned preferred embodiment of FIG. 7, it is assumed that the ShMC shelf 701 is set to the active mode, and the other ShMC shelf 702 is set to the standby mode.

As described above, if the above-mentioned state information is determined, the state information of the active-mode ShMC shelf 701 is periodically exchanged with that of the active-mode RP shelf 501 via the IPC shelf 503 at intervals of the second period t2 at step S1002.

In the case, as depicted in FIG. 7, state information of the RP shelf 501 is exchanged with that of the ShMC shelf 701 via the path 703~507. In this case, although the port's link-down state or the shelf switching occurs in the RP shelf, a communication path associated with the active-mode RP shelf is guaranteed by the duplex implementation method as shown in FIG. 9.

However, if the IPC shelf 503 escapes from a prescribed path, or if unexpected errors occur in the I1 or S1 port connected to the IPC shelf 503 or the ShMC 701, then unexpected errors occur between the ShMC shelf 701 and the RP shelf 501.

Therefore, if the IPC shelf 503 (or the SF shelf) escapes from the predetermined path, or a porting link-down occurs by the errors of the I1 and S1 ports during the state information between the ShMC shelf 701 and the RP shelf 501, or if the active-mode ShMC shelf 701 does not communicate with the RP shelf 501 within the second period (t2) at step S1003, then the active-mode ShMC shelf 701 starts communicating with the active-mode RP shelf 501 via the path 705↔704↔511↔507 via the S1's port and the data bridge function of the standby-mode ShMC shelf 702.

In the meantime, the state information of the standby-mode ShMC shelf 702 is communicated with that of the active-mode ShMC shelf 701 via the path 705, and checks whether the response signal is received from the active-mode ShMC shelf 701 within the fourth period (t4) (where t4>t2+duplex processing time) at step S1005. In this case, if it is determined that there is no response signal within the fourth period, the standby-mode ShMC shelf 702 is enabled in the active mode, and performs the shelf switching from the ShMC shelf 701 to the standby-mode ShMC shelf at step S1006.

As apparent from the above description, the duplex implementation apparatus for the ATCA system via a base interface, and a method for controlling the same according to the present invention can implement the duplex function capable of increasing reliability and stability of the ATCA system within the ATCA system standard. Also, the duplex implementation apparatus or method can be implemented by changing software configuration without changing hardware.

According to the present invention, the above-mentioned duplex implementation apparatus does not requires a high-performance function (e.g., a Spanning Tree Protocol (STP) function or an L3 function), such that it implements a rapid switching time, and reduces an amount of system load.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duplex implementation method of an Advanced Telecom Computing Architecture (ATCA) system via a base interface capable of providing a duplex IPC communication path between two duplex IPC (Inter-Processor Communication) shelves and two duplex routing protocol shelves, each of the routing protocol shelves comprising the steps of:

a) assigning a representative IP address to any one of two ports connected to the base interface, wherein the step a) includes the steps of:
a-1) determining an active mode or standby mode of two duplex routing protocol shelves, and determining IPC paths of the two duplex routing protocol shelves; and
a-2) assigning a first IP address acting as the representative IP address to a port connected to a determined IPC path of an active-mode routing protocol shelf, assigning a second IP address to the remaining ports other than the first IP address;
b) performing transmission/reception of state- and synchronous-data with a counterpart routing protocol shelf using the representative IP address, performing transmission/reception state information with individual switching processors of the IPC shelves, performing, by two routing protocol shelves, transmission/reception of state- or synchronous-data, and performing, by the routing protocol shelf or the switching processor, state information at intervals of a second period, wherein the step b) includes the steps of:
b-1) exchanging, by the active-mode routing protocol shelf, state and synchronous data with the standby-mode routing protocol shelf using first and third IP addresses; and
b-2) exchanging, by the active-mode routing protocol shelf and a switching processor, state information with each other;
c) determining whether unexpected error or link-error occurs in a port to which the representative IP address has been assigned; and
d) if the port errors or the link errors are detected, assigning the representative IP address to the other port, and performing port-switching operation, wherein the step d) includes the steps of:
d-1) if the active-mode routing protocol shelf is determined, changing, by the active-mode routing protocol shelf, a port where a port or link error has occurred to a second IP address, changing the remaining ports to a first IP address; and
d-2) if the standby-mode routing protocol shelf is determined, changing, by the standby-mode routing protocol shelf, any one port in which a port- or link-error occurs to a fourth IP address, and changing another port to a third IP address;
e) determining whether a response signal is generated from a relative routing protocol shelf during the second period, in which the step d) further includes the step of:
if there is no response signal received from the relative routing protocol shelf within the second period at the step e), performing a port switching operation;
f) determining, by the standby-mode routing protocol shelf, receiving a state response signal from the active-mode routing protocol shelf within a first period; and
g) if the standby-mode routing protocol shelf does not receive the state response signal from the active-mode routing protocol shelf within the first period, performing, by the standby-mode routing protocol shelf, a shelf switching to acquire an active mode;
h) determining the presence or absence in a hardware failure in the active-mode routing protocol shelf; and
i) performing a shelf switching operation even though the hardware failure occurs in the active-mode routing protocol shelf.

2. The method according to claim 1, wherein the first period is longer than a time period associated with "second period+duplex processing time".

3. The method according to claim 1, further comprising the step of: if the hardware failure occurs in the active-mode routing protocol shelf at the step h), reporting information of the failure.

4. An Advanced Telecom Computing Architecture (ATCA) system for providing a duplex IPC path between routing protocol shelves and IPC shelves via a base interface, providing a duplex IPC path between the IPC shelves and Line Interface (LI) shelves, and providing a single IPC path between the IPC shelves and Switch Fabric (SF) shelves or between the IPC shelves and ShMC (Shelf management Control) shelves, the system comprising:

two duplex routing protocol shelves for assigning a representative IP address to a first port to be used, exchanging state information and synchronous data with each other via the representative IP address, and assigning the representative IP address to a second port if an error or link-down state occurs in the first port or there is no response signal within a predetermined period, thereby performing a port switching operation;

two IPC shelves for switching control packets between the routing protocol shelves, the LI shelves, and the ShMC shelves, and providing IPC communication;

a plurality of LI shelves, each of which includes two ports connected to two IPC paths connected to the two IPC shelves, for assigning a representative IP address to a first port to be used, performing IPC communication with the routing protocol shelves using the representative IP address, assigning the representative IP address to a second port if an error or link-down state occurs in the first port to which the representative IP address is assigned, continuously performing IPC communication, and performing I/O (Input/Output) interfacing with any external device;

switch fabric (SF) shelves for exchanging packets with the LI shelves; and two ShMC shelves, under an active mode, for performing IPC communication with the routing protocol shelves with the single IPD path received via the base interface, managing state-, sensor-, and event-information of the routing protocol shelves, the LI shelves, the IPC shelves, and the SF shelves, controlling individual powers of the routing protocol shelves, the LI shelves, the IPC shelves, and the SF shelves; and, under a standby mode, for providing a data bridge function for the IPC communication of an active-mode ShMC shelf in which a port error or link-down state has occurred, wherein the routing protocol shelves, if a hardware failure occurs or if a standby-mode routing protocol shelf does not receive a response signal from an active routing protocol shelf during a first period acting as a state information response period between the standby-mode routing protocol shelf and the active-mode routing protocol shelf, performs a shelf switching operation between the active-mode routing protocol shelf and the standby-mode routing protocol shelf, the routing protocol shelves assign the representative IP address to the second port during a second period acting as a state information response period associated with a switching processor for controlling the IPC shelves, and the LI shelves assign the representative IP address to the second port even though they do not receive response signals from the routing protocol shelves during a second period.

5. The ATCA system according to claim 4, wherein the routing protocol shelves inform an operator or administrator of the occurrence of errors in a LI shelf having no response signal during a third period.

6. The ATCA system according to claim 5, wherein:
the ShMC shelves transmit state information to the routing protocol shelves within a second period, and performing IPC communication with the routing protocol shelves via a standby-mode ShMC shelf if the ShMC shelves do not transmit the state information to the routing protocol shelves within the second period.

7. The ATCA system according to claim 6, wherein a first period is longer than the sum of the second period and a duplex processing time.

8. The ATCA system according to claim 5, wherein a third period is longer than the sum of the second period and a duplex processing time.

* * * * *